S. G. REYNOLDS.
PLOWS.

No. 190,904.            Patented May 15, 1877.

WITNESSES

INVENTOR

UNITED STATES PATENT OFFICE.

SAMUEL G. REYNOLDS, OF BRISTOL, RHODE ISLAND.

IMPROVEMENT IN PLOWS.

Specification forming part of Letters Patent No. 190,904, dated May 15 1877; application filed April 19, 1877.

*To all whom it may concern:*

Be it known that I, SAMUEL G. REYNOLDS, of Bristol, in the county of Bristol, and State of Rhode Island, have invented certain new and useful Improvements in Plows; and I do hereby declare the following to be a full, clear, and exact description of the invention, such as will enable others skilled in the art to which it pertains, to make and use it, reference being had to the accompanying drawings, which form a part of this specification.

My invention relates to an improvement in plows; and it consists in the construction and arrangement of parts, that will be more fully described hereinafter, whereby I am enabled to use revolving disks for both land-side and mold-board in a practical and effective manner, and produce a plow which can be drawn through the earth with a less expenditure of power than those now in use.

Figure 1:
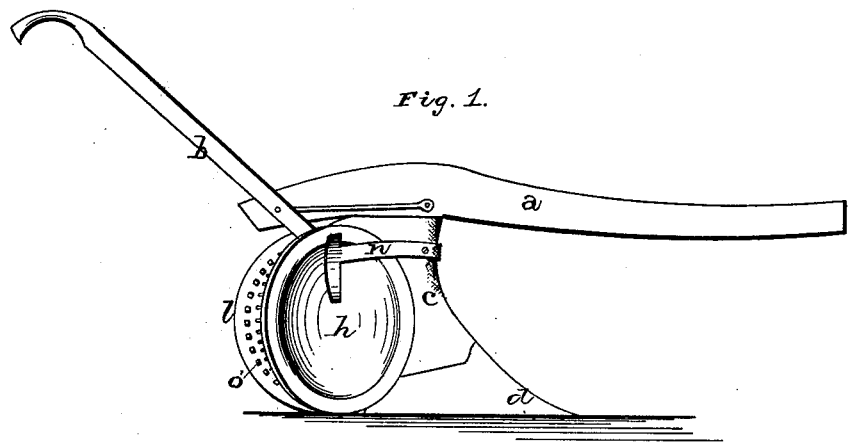
Figure 2:
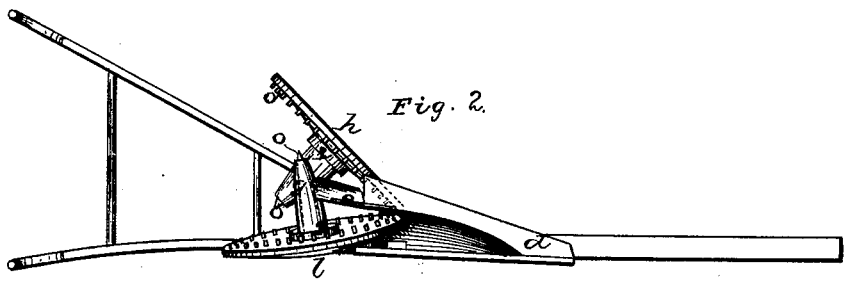
Figure 3:
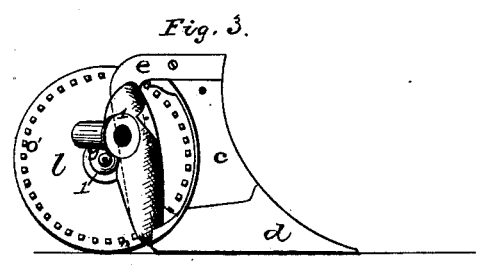

Figure 1 is a side elevation of my invention. Fig. 2 is an inverted view of the same. Fig. 3 is a detail view, showing the mold-board removed.

$a$ represents the beam; $b$, the handles; $c$, the standard; and $d$ the point, which is fastened to the end of the standard, all of which parts may be constructed in any manner desired. Fastened to the right side of the top of the standard and curving downward and backward so that its lower end is fastened to the lower inside of the standard, or to the inside of the point $d$, is the plate $e$, and fastened to or cast with it in a single piece are the double journal-bearings $g$. These bearings cross each other at a suitable angle, and, being placed one upon top of the other, form a solid block or piece, which takes up very little room.

A portion of the casting of which these bearings form a part extends up above the bearings to a considerable distance, and has the lower end of the right handle attached thereto, while another portion projects downward, nearly to the ground. The mold-board is formed by the revolving disk $h$, which is slightly concave on its outer face, and set at such an angle to the standard as is best calculated to turn the sod. The inner side of this disk is slightly convex, and has a row of cogs around its outer edge, the journal $o$ projecting from its center. The land-side is formed by a similar disk, $l$, which is convex on its outer side, and has its front edge turned inward so as to reach in the rear of the standard, over to the inner edge of the disk $h$. Each of these disks has a row of cogs $o'$ upon its inner side, and, as these cogs mesh together, when one disk turns the other turns also. The journal $o$ from each disk is made tapering, and fits in a tapering socket in the bearings, and, as the pressure is constantly inward on the two disks, the more the journals wear the better they fit.

Upon the outer edge of each bearing is made a flange, 1, and to the inside of each disk is fastened a dust-band, 2, which fits over the top of this flange and keeps out the dust and dirt from the bearing. The mold-board is kept clean by the scraper $n$, which is fastened to the front of the standard, and extends back over the side of the disk in such a manner as to clean it from the center out to the edge.

It will be seen that the axle of the mold-board is placed above that of the land-side, and is perfectly horizontal, while that of the land-side is inclined slightly downward, thereby causing the land-side to incline inward at the top, and to act strongly in opposition to the mold-board, whereby the pressure of the land-side toward the mold-board is greatly increased.

By having the cogs on the inside of the disks formed as shown, and having them mesh together, as shown, all dirt and obstructions that catch in them are thrown out, instead of clogging the action of the wheels.

Having thus described my invention, I claim—

1. In a plow having the two rotary disks, $h\ l$, the journals $o$ made to cross each other, the bearings being cast in one piece, substantially as described.

2. The two rotary disks $h\ l$, having their journals $o$ arranged to cross each other, one journal being horizontal and the other inclined downward so as to cause the land-side to act in opposition to the mold-board, substantially as set forth.

3. The concave-disk mold-board $h$, with conical journals $o$, and provided with cogs $o'$, in combination with convex land-side disk $l$, also provided with conical journal, and with cogs that engage with the cogged mold-board, substantially as set forth.

In testimony that I claim the foregoing I have hereunto set my hand this 10th day of April, 1877.

SAMUEL G. REYNOLDS.

Witnesses:
 J. P. REYNOLDS,
 CHARLES H. SMITH.